United States Patent
Griffith et al.

(10) Patent No.: US 10,037,075 B2
(45) Date of Patent: Jul. 31, 2018

(54) VOLTAGE REGULATION TECHNIQUES FOR ELECTRONIC DEVICES

(71) Applicant: INTEL CORPORATION, Santa Clara, CA (US)

(72) Inventors: Brian J. Griffith, Auburn, WA (US); Viktor D. Vogman, Olympia, WA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/089,489

(22) Filed: Apr. 2, 2016

(65) Prior Publication Data

US 2017/0285711 A1 Oct. 5, 2017

(51) Int. Cl.
| | |
|---|---|
| *G06F 1/28* | (2006.01) |
| *G06F 1/26* | (2006.01) |
| *G06F 1/32* | (2006.01) |
| *H02M 3/04* | (2006.01) |
| *G06F 1/30* | (2006.01) |
| *H02J 7/00* | (2006.01) |

(52) U.S. Cl.
CPC ............ *G06F 1/3296* (2013.01); *G06F 1/26* (2013.01); *G06F 1/263* (2013.01); *G06F 1/305* (2013.01); *H02J 7/00* (2013.01); *H02M 3/04* (2013.01)

(58) Field of Classification Search
CPC ....... H02J 7/007; H02J 7/0065; G06F 1/3296; G06F 1/26; G06F 1/266; G06F 1/28; G06F 1/30; G06F 21/81; H02M 2001/0006; H02M 2003/1566; H02M 2001/0032; H02M 2001/0038; H02M 3/04

See application file for complete search history.

(56) References Cited

U.S. PATENT DOCUMENTS

| | | | | |
|---|---|---|---|---|
| 3,697,856 A | * | 10/1972 | Huang | G05F 1/565 323/223 |
| 8,030,900 B2 | * | 10/2011 | Hussain | H02J 7/0057 320/135 |
| 9,705,402 B1 | * | 7/2017 | Carpenter, Jr. | H01H 85/0241 |
| 2005/0195544 A1 | * | 9/2005 | Fung | H02J 7/345 361/93.1 |
| 2008/0088998 A1 | * | 4/2008 | So | H02H 9/025 361/93.9 |
| 2010/0123435 A1 | | 5/2010 | Piazza et al. | |

(Continued)

OTHER PUBLICATIONS

International Search Report received for PCT Patent Application No. PCT/US2017/025129, dated Jul. 11, 2017, 3 pages.

*Primary Examiner* — Gustavo Rosario Benitez (57) ABSTRACT

Voltage regulation techniques for electronic devices are described. In one embodiment, for example, an apparatus may comprise an electronic element comprising one or more integrated circuits, a voltage regulator to regulate an input voltage of the electronic element, the voltage regulator to source an output current comprising at least a portion of an input current of the electronic element, the voltage regulator to operate in a current-limiting mode to limit the output current when the input current exceeds a threshold current, and a capacitor bank comprising one or more capacitors, the capacitor bank to source a supplemental current to supplement the output current of the voltage regulator when the voltage regulator operates in the current-limiting mode. Other embodiments are described and claimed.

25 Claims, 8 Drawing Sheets

(56) References Cited

U.S. PATENT DOCUMENTS

| | | | |
|---|---|---|---|
| 2010/0146333 A1* | 6/2010 | Yong | G06F 1/305 |
| | | | 714/14 |
| 2012/0068542 A1* | 3/2012 | Alappat | H02J 7/345 |
| | | | 307/66 |
| 2012/0161740 A1 | 6/2012 | Vogman | |
| 2012/0286691 A1 | 11/2012 | Jesme | |
| 2013/0147446 A1 | 6/2013 | Kris et al. | |
| 2014/0082377 A1* | 3/2014 | Dinh | G06F 1/26 |
| | | | 713/300 |
| 2014/0281618 A1* | 9/2014 | Sultenfuss | G06F 1/30 |
| | | | 713/323 |
| 2015/0006916 A1 | 1/2015 | Knoth et al. | |
| 2015/0268709 A1* | 9/2015 | Morning-Smith | G06F 1/28 |
| | | | 307/23 |
| 2016/0134197 A1* | 5/2016 | Mao | H02M 3/33515 |
| | | | 363/21.13 |
| 2016/0285267 A1* | 9/2016 | Stone | H02J 3/32 |

* cited by examiner

VOLTAGE REGULATION TECHNIQUES FOR ELECTRONIC DEVICES

TECHNICAL FIELD

Embodiments herein generally relate to voltage regulation and power management.

BACKGROUND

In an electronic system such as a computer, the value of an input voltage at a given element may need to be maintained within a particular range of values. In many cases, such a voltage range may comprise substantially different voltages than are available directly from power supply lines of the system. For example, a system featuring a 12 v main power supply voltage may comprise a processor for which an input voltage should not be permitted to exceed 1.5 v. In order to accommodate the voltage requirements of a given element, a voltage regulator may be configured to step down a power supply voltage in order to provide that element with an appropriate input voltage.

DETAILED DESCRIPTION

Various embodiments may be generally directed to voltage regulation techniques for electronic devices. In one embodiment, for example, an apparatus may comprise an electronic element comprising one or more integrated circuits, a voltage regulator to regulate an input voltage of the electronic element, the voltage regulator to source an output current comprising at least a portion of an input current of the electronic element, the voltage regulator to operate in a current-limiting mode to limit the output current when the input current exceeds a threshold current, and a capacitor bank comprising one or more capacitors, the capacitor bank to source a supplemental current to supplement the output current of the voltage regulator when the voltage regulator operates in the current-limiting mode. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
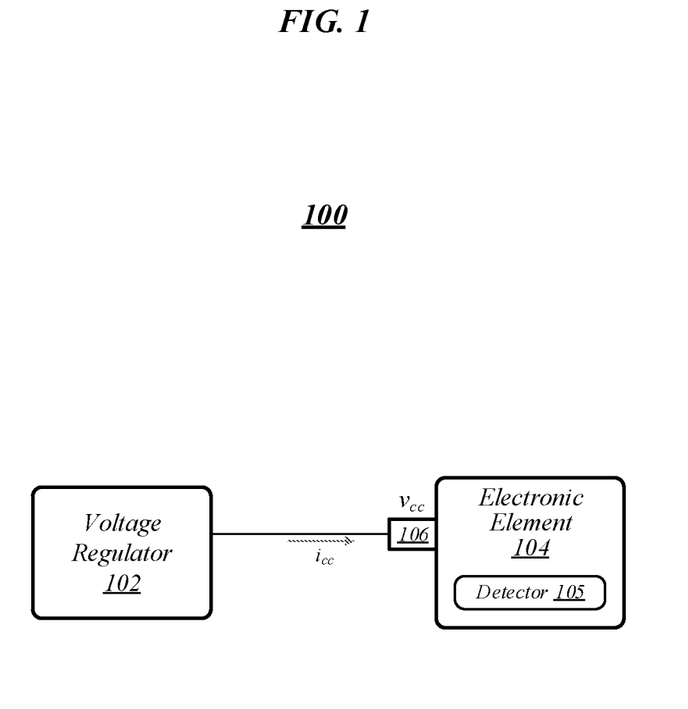
FIG. 1 illustrates an embodiment of a first operating environment.

FIG. 1 illustrates an example of an operating environment 100 that may be representative of various embodiments. In operating environment 100, a voltage regulator 102 is configured to perform voltage regulation for an electronic element 104. In some embodiments, voltage regulator 102 may comprise a multi-phase voltage regulator. In various embodiments, voltage regulator 102 may comprise a buck converter, such as a multi-phase buck converter. The embodiments are not limited in this context.

Electronic element 104 may generally comprise a set of one or more electronic devices, components, modules, and/or elements collectively arranged to operate using electric power provided by an external source. In some embodiments, electronic element 104 may comprise one or more integrated circuits. In various embodiments, electronic element 104 may comprise processing circuitry, examples of which may include without limitation a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a single-core processor, a multi-core processor such as a dual-core or quad-core processor, or any other microprocessor or central processing unit (CPU). In some embodiments, electronic element 104 may comprise a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), or a programmable logic device (PLD). The embodiments are not limited to these examples.

In various embodiments, electronic element 104 may comprise memory circuitry. In some embodiments, for example, electronic element 104 may be a memory module comprising read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, or silicon-oxide-nitride-oxide-silicon (SONOS) memory. The embodiments are not limited to these examples.

In various embodiments, electronic element 104 may comprise a "system on a chip" (SoC), within which circuitry of multiple types and/or functions is integrated. For example, in some embodiments, electronic element 104 may comprise both processing circuitry and memory circuitry. Additional examples of types of circuitry that may be comprised/integrated within electronic element 104 may include timing circuitry such as oscillator(s) and/or phase-locked loops (PLLs), graphics processing circuitry, signal processing circuitry, and interface control circuitry. The embodiments are not limited to these examples.

In the example of FIG. 1, voltage regulator 102 may be configured to regulate an input voltage $v_{cc}$ of electronic element 104. In various embodiments, the input voltage $v_{cc}$ may comprise a voltage at a power terminal 106. In some embodiments, the input voltage $v_{cc}$ may fluctuate during ongoing operation of voltage regulator 102 and electronic element 104, as may an input current $i_{cc}$, which may flow into power terminal 106. In various embodiments, the input voltage $v_{cc}$ and the input current $i_{cc}$ may be interdependent, such that fluctuations of these two parameters are generally influenced by a relationship therebetween. In some embodiments, input voltage $v_{cc}$ and input current $i_{cc}$ may be interdependent in such a fashion that as input current $i_{cc}$ increases, input voltage v decreases. In various embodiments, for example, input voltage $v_{cc}$ and input current $i_{cc}$ may depend on each other according at least approximately to a load-line equation such as Equation (1), as follows:

$$v_{cc} = V_{cc-idle} i_{cc} * R_{LL} \tag{1}$$

where $V_{cc-idle}$ represents a value of $v_{cc}$ when electronic element 104 is in an idle state, and $R_{LL}$ signifies a resistance determined according to a load line representing an equivalent internal resistance of voltage regulator 102. In some embodiments, there may be a time lag with respect to fluctuations in $i_{cc}$ and the corresponding fluctuations in $v_{cc}$ (an "$i_{cc}-v_{cc}$ time lag") according to a load-line equation such as Equation (1). In various embodiments, such an $i_{cc}-v_{cc}$ time lag may comprise tens of microseconds. In some embodiments, adaptive voltage positioning (AVP) functionality of electronic element 104 may cause—or contribute to—such an $i_{cc}-v_{cc}$ time lag. The embodiments are not limited in this context.

In various embodiments, electronic element 104 may be designed to draw up to a peak real application current $I_{cc-app}$ when operating as intended, such that $i_{cc} \leq I_{cc-app}$ during normal operation. In some embodiments, however, it may be possible for electronic element 104 to be configured either unintentionally or maliciously to operate in a fashion that causes it to draw an amount of input current $i_{cc}$ that exceeds $I_{cc-app}$. In various embodiments, it may be possible for electronic element 104 to be configured to operate in a fashion that causes it to draw up to a maximum amount of input current $I_{cc-max}$, where $I_{cc-max} > I_{cc-app}$. In some embodiments, operation in the types of excessively power-intensive operational states that may cause $i_{cc}$ to exceed $I_{cc-app}$ may have the potential to cause damage to electronic element 104. The embodiments are not limited in this context.

In various embodiments, a detector 105 may be configured to monitor the input voltage $v_{cc}$. In some embodiments, as depicted in FIG. 1, detector 105 may be comprised within electronic element 104. In various embodiments, rather than being comprised within electronic element 104, detector 105 may comprise an external device or circuitry that is coupled to electronic element 104. In some embodiments, detector 105 may be configured to monitor $v_{cc}$ in order to detect excessively power-intensive operational states. In various embodiments, detector 105 may be operative to detect an excessively power-intensive operational state based on a detection that $v_{cc}$ has fallen below a threshold voltage. In some embodiments, the threshold voltage may comprise a minimum real application voltage $V_{cc-app}$, which may generally represent a lowest $v_{cc}$ value that would be expected to be observed during operation of electronic element 104 as intended. In various embodiments, $V_{cc-app}$ may comprise a value of $v_{cc}$ when $i_{cc} = I_{cc-app}$ according a load-line equation such as Equation (1) above. The embodiments are not limited in this context.

In some embodiments, detector 105 may be configured to respond to a detection of an excessively power-intensive operational state by causing electronic element 104 to reduce its operating power. In various embodiments, detector 105 may generate a signal to trigger this reduction in operating power. In some embodiments, such a signal may prompt electronic element 104 to transition from first power state to a second power state that is associated with a lower level of power consumption than the first power state. In various embodiments, the second power state may correspond to a reduced operating frequency relative to the first power state. In some embodiments, reducing the power consumption of electronic element 104 may cause $i_{cc}$ to decrease to a value below $I_{cc-app}$. However, in various embodiments, the throttling of electronic element 104—and thus the reduction of $i_{cc}$ to a value below $I_{cc-app}$—may not occur immediately once $i_{cc}$ increases past $I_{cc-app}$, but rather may be delayed by the $i_{cc}-v_{cc}$ time lag. As such, in some embodiments, it may be possible for $i_{cc}$ to ramp up above $I_{cc-app}$ to a value as high as $I_{cc-max}$ and remain at that value for a significant amount of time before detector 105 detects the excessively power-intensive state and causes electronic element 104 to throttle down its power consumption. The embodiments are not limited in this context.

In operating environment 100, voltage regulator 102 may source all of the input current $i_{cc}$ that flows into power terminal 106. As such, in order to function properly during a given time interval, voltage regulator 102 may need to be capable of reliably sourcing at least an amount of current corresponding to a largest amount of input current $i_{cc}$ that electronic element 104 may draw during that time interval. As noted above, in various embodiments, it may be possible for $i_{cc}$ to remain at a value as high as $I_{cc-max}$ for a significant amount of time. In such embodiments, in order to safeguard against potential damage to one or both of voltage regulator 102 and electronic element 104, it may be necessary that voltage regulator 102 be sized such that it is capable of sourcing at least an amount of current equal to $I_{cc-max}$. This constraint may necessitate the use of a larger and/or more costly voltage regulator than would be required in order to support only the peak real application current $I_{cc-app}$.

Disclosed herein are voltage regulation techniques that may be implemented in some embodiments in order to enable the regulation of an input voltage of a given electronic device using a smaller and/or less costly voltage regulator than would be required according to conventional techniques. In various embodiments, according to one or more of the disclosed techniques, a voltage regulator for an electronic element may be configured to monitor an input voltage of an electronic element and to operate in a current-limiting mode and prevent its output current from exceeding an allowable current limit when an input current of the electronic element exceeds a threshold current. In some embodiments, the threshold current may comprise the allowable current limit. In some embodiments, a capacitor bank may be arranged to source a supplemental current in order to supplement the output current of the voltage regulator when the voltage regulator operates in the current-limiting mode. In various embodiments, a detector may be configured to trigger a reduction in an operating power of the electronic element in response to a detection that the input voltage of the electronic element is less than a threshold voltage. The embodiments are not limited in this context.

Figure 2:
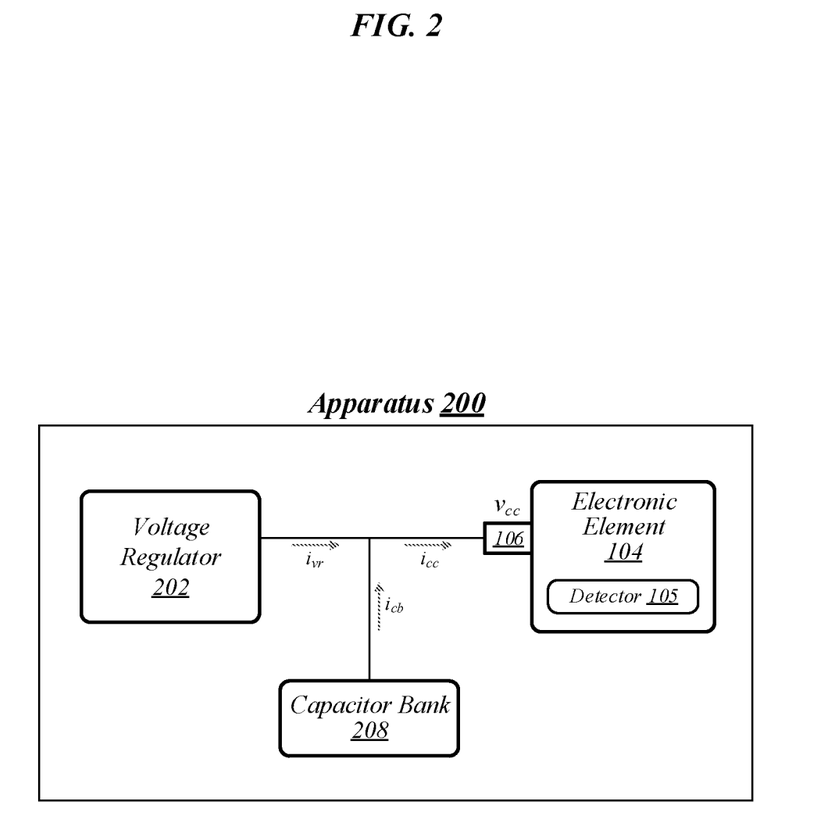
FIG. 2 illustrates an embodiment of an apparatus.

FIG. 2 illustrates an apparatus 200 that may be representative of the implementation of one or more of the disclosed voltage regulation techniques according to some embodiments. As shown in FIG. 2, apparatus 200 comprises the same electronic element 104 as is depicted in operating environment 100 of FIG. 1. Apparatus 200 also comprises a voltage regulator 202 and a capacitor bank 208. Voltage regulator 202 may be generally configured to regulate the input voltage $v_{cc}$ at power terminal 106 of electronic element 104, and may be selected/designed such that it is capable of reliably sourcing the peak real application current $I_{cc-app}$ associated with electronic element 104. In various embodiments, voltage regulator 202 may comprise a multi-phase voltage regulator. In some embodiments, voltage regulator 202 may comprise a buck converter, such as a multi-phase buck converter. The embodiments are not limited in this context.

Capacitor bank 208 may comprise an arrangement of one or more capacitors. Examples of types of capacitors that may be comprised in capacitor bank 208 in various embodiments may include—without limitation—electrolytic capacitors, film capacitors, and ceramic capacitors. In some embodiments, capacitor bank 208 may comprise of one or more capacitors designed and/or configured to operate as filter capacitors. In various embodiments, apparatus 200 may comprise a motherboard (not shown in FIG. 2), and voltage regulator 202, electronic element 104, and capacitor bank 208 may be mounted and interconnected on that motherboard. The embodiments are not limited in this context.

During operation of apparatus 200, the value of $i_{cc}$ at any given point in time may be described according to Equation (2), as follows:

$$i_{cc} = i_{vr} + i_{cb} \quad (2)$$

where $i_{vr}$ represents an output current of voltage regulator 202, and $i_{cb}$ represents an output current of capacitor bank 208. In some embodiments, voltage regulator 202 may comprise a multi-phase voltage regulator, and $i_{vr}$ may be equal to the combined phase current that is output from voltage regulator 202. The embodiments are not limited in this context.

In various embodiments, voltage regulator 202 may be capable of operating in a current-limiting mode. In some embodiments, the current-limiting mode may comprise a pulse-by-pulse current-limiting mode. In various embodiments, voltage regulator 202 may be configurable to monitor its output current $i_{vr}$, in order to determine whether it has reached an allowable current limit $I_{vr-lim}$. In some embodiments, the value of allowable current limit $I_{vr-lim}$, may be programmable or otherwise configurable. In various embodiments, a value for allowable current limit $I_{vr-lim}$, may be selected such that it is not less than the value of $I_{cc-app}$. In some embodiments, the value of allowable current limit $I_{vr-lim}$, may be set equal to the value of $I_{cc-app}$. In various other embodiments, the value of allowable current limit $I_{vr-lim}$, may be set to the value of $I_{cc-app}$ plus a small margin to account for current measurement inaccuracy at voltage regulator 202. In some embodiments, voltage regulator 202 may allow its output current $i_{vr}$ to fluctuate freely while it remains below $I_{vr-lim}$, but to enter the current-limiting mode when it detects that $i_{vr}$ has reached $I_{vr-lim}$. In various embodiments, while operating in the current-limiting mode, voltage regulator 202 may not permit its output current $i_{vr}$ to increase. In some embodiments, while operating in the current-limiting mode, voltage regulator 202 may substantially function as a current source. In various embodiments, while operating in the current-limiting mode, voltage regulator 202 may source a substantially-fixed amount of current that is substantially equal to its allowable current limit $I_{vr-lim}$. The embodiments are not limited in this context.

Figure 3:
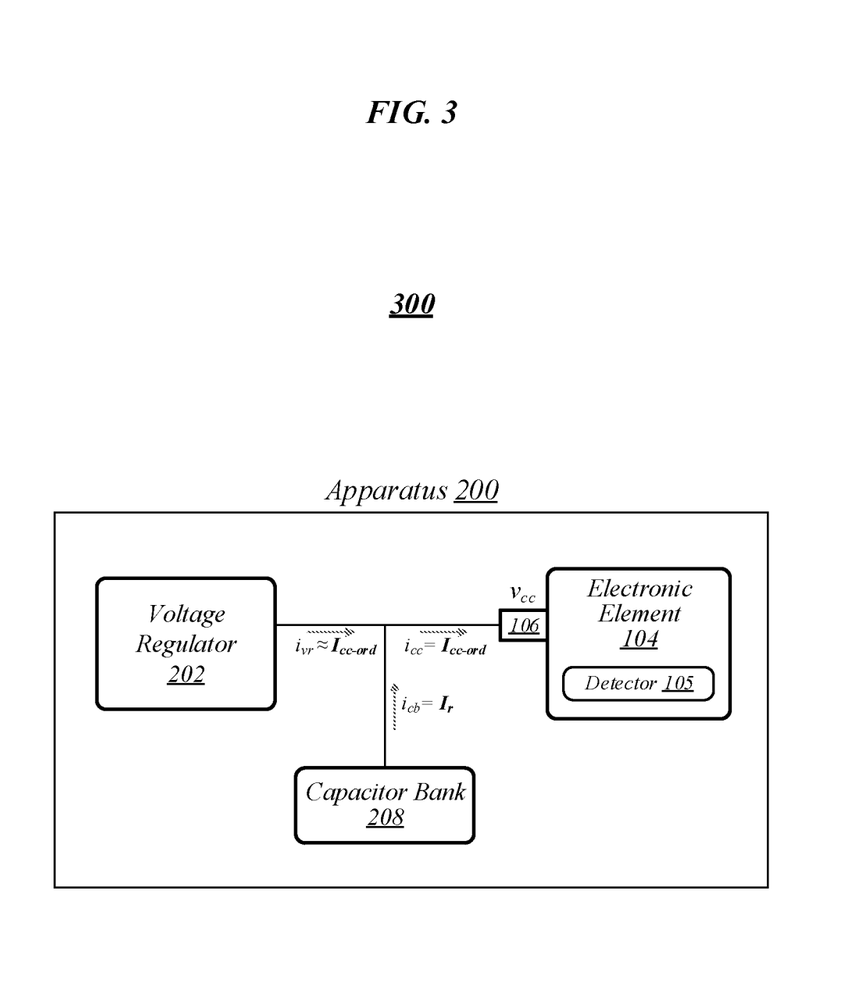
FIG. 3 illustrates an embodiment of a second operating environment.

FIG. 3 illustrates an example of an operating environment 300 that may be representative of operations of apparatus 200 of FIG. 2 according to some embodiments. In operating environment 300, electronic element 104 may operate in an "ordinary current (OC) state," according to which, at a given point in time, it may draw an "ordinary current" $I_{cc-ord}$ that does not exceed its peak real application current $I_{cc-app}$. It is to be appreciated that the term "ordinary," as employed in this context, connotes simply that the amount $I_{cc-ord}$ of drawn current does not exceed the peak real application current $I_{cc-app}$ associated with electronic element 104, and is not intended to characterize the amount of current drawn during operation in an OC state in any other sense. As shown in FIG. 3, at the given point in time at which electronic element 104 draws the ordinary current $I_{cc-ord}$, the output current $i_{vr}$ of voltage regulator 202 may be approximately equal to $I_{cc-ord}$. The difference between $I_{cc-ord}$ and the exact value of $i_{vr}$ at the given point in time may be equal to a value $I_r$ representing any current sourced or drawn by capacitor bank 208 at that point in time. In various embodiments, the current sourced or drawn by capacitor bank 208 at the given point in time may comprise ripple current. The embodiments are not limited in this context.

Figure 4:
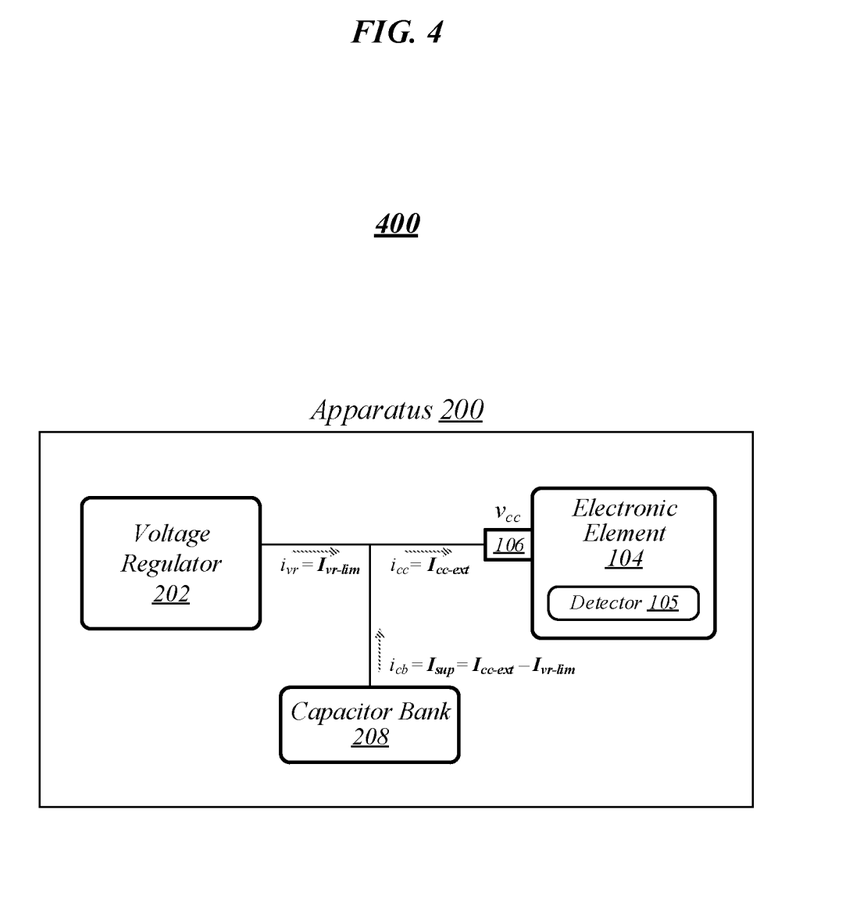
FIG. 4 illustrates an embodiment of a third operating environment.

FIG. 4 illustrates an example of an operating environment 400 that may be representative of operations of apparatus 200 of FIG. 2 according to some embodiments. In operating environment 400, electronic element 104 may operate in an "extraordinary current (EC) state," according to which it draws an "extraordinary current" $I_{cc-ext}$ that exceeds the allowable current limit $I_{vr-lim}$ of voltage regulator 202. It is to be appreciated that the term "extraordinary," as employed in this context, connotes simply that the amount $I_{cc-ext}$ of drawn current exceeds the allowable current limit $I_{vr-lim}$ of voltage regulator 202, and is not intended to characterize the amount of current drawn during operation in an EC state in any other sense. In operating environment 400, because $i_{cc}$ exceeds $I_{vr-lim}$, voltage regulator 202 may operate in a current-limiting mode, according to which it may source a substantially-fixed output current of $I_{vr-lim}$ that is less than the amount $I_{cc-ext}$ of current required by electronic element 104. However, a supplemental amount of current $I_{sup}$ supplied by capacitor bank 208 may make up the difference between $I_{vr-lim}$ and $I_{cc-ext}$. Thus, the extraordinary current demanded by electronic element 104 may be supplied without requiring voltage regulator 202 to source more than $I_{vr-lim}$. As such, it may be possible to use a smaller and/or less costly voltage regulator to implement voltage regulator 202 than that which would be required to support the same extraordinary current $I_{cc-ext}$ in operating environment 100 of FIG. 1.

It is worthy of note that in various embodiments, capacitor bank 208 may only be capable of sourcing the supplemental amount of current $I_{sup}$ for a limited amount of time. In some embodiments, the amount of time that capacitor bank 208 is able to source $I_{sup}$ may be less than the $i_{cc}$-$v_{cc}$ time lag in operating environment 100 of FIG. 1. However, in various embodiments, due to the output current of voltage regulator 202 being limited to $I_{vr-lim}$, the capacitor(s) in capacitor bank 208 may discharge relatively quickly, which may significantly reduce the $i_{cc}$-$v_{cc}$ time lag in operating environment 400. As such, in some embodiments, once $i_{cc}$ ramps up past $I_{cc-app}$, the amount of time that elapses until $v_{cc}$ decreases below $V_{cc-app}$ may be significantly less than the amount of time that would elapse in operating environment 100 of FIG. 1. As a result, detector 105 may detect the excessively power-intensive operational state and cause electronic element 104 to throttle down its power consumption significantly more quickly than it would in operating environment 100. For example, according to various embodiments, configuring voltage regulator 202 to force it to operate in the current limiting mode when $i_{vr}$ exceeds $I_{vr-lim}$ may enable detector 105 to detect an excessively power-intensive operational state and cause electronic element 104 to throttle down its power consumption approximately ten times faster than it would in operating environment 100. Thus, capacitor bank 208 may only need to be able to source the supplemental amount of current $I_{sup}$ for a relatively brief period of time. In some embodiments, for example, capacitor bank 208 may only need to source $I_{sup}$ for approximately 1 microsecond. The embodiments are not limited to these examples.

Figure 5:
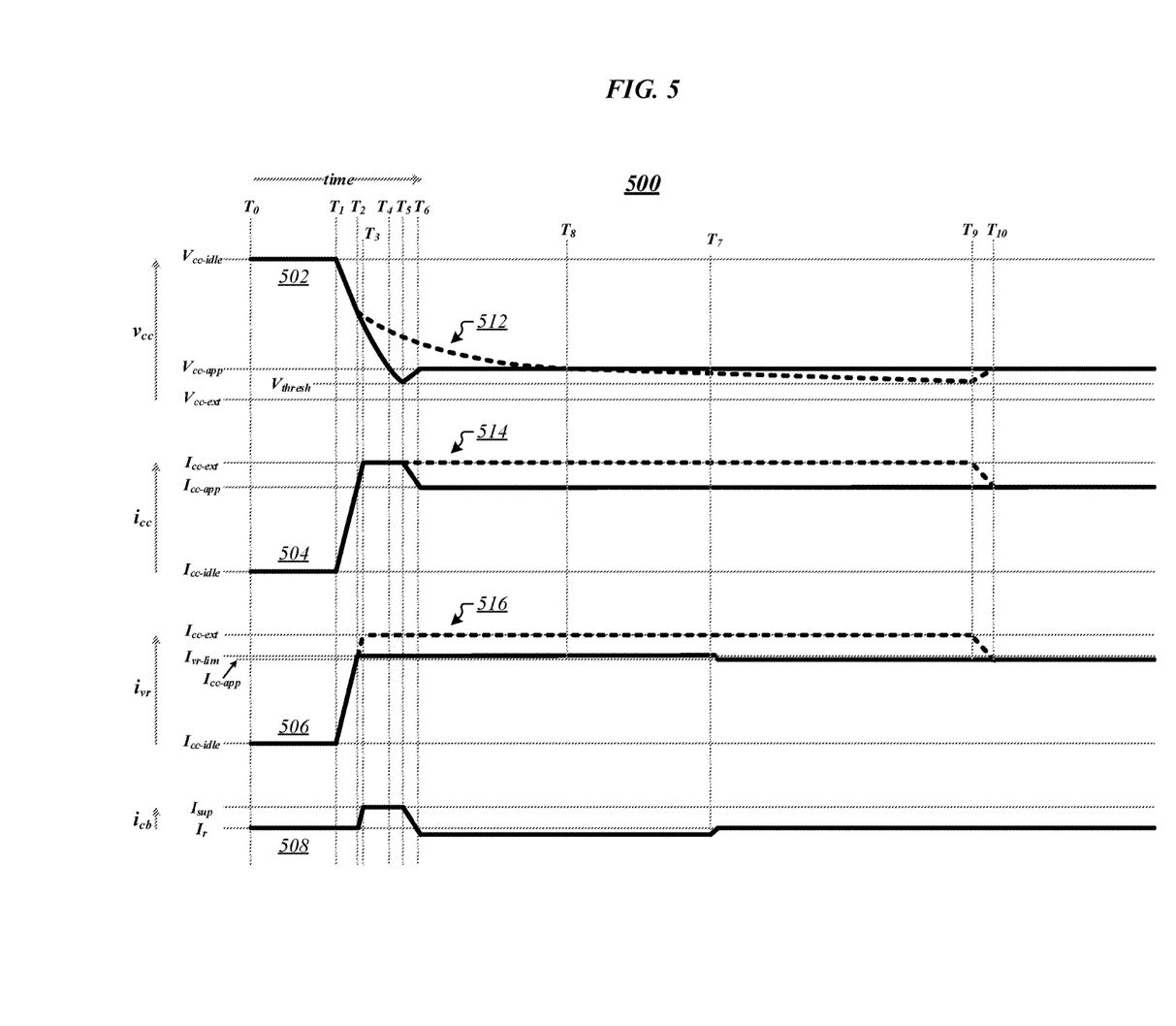
FIG. 5 illustrates an embodiment of a timing diagram.

FIG. 5 illustrates an example of a timing diagram 500 that may be representative of the implementation of one or more of the disclosed voltage regulation techniques according to various embodiments. More particularly, timing diagram 500 depicts fluctuations in $v_{cc}$, $i_{cc}$, $i_{vr}$, and $i_{cb}$ such as may be observed in an example embodiment in which one or more of the disclosed voltage regulation techniques are implemented. In timing diagram 500, a solid line 502 illustrates the behavior of $v_{cc}$, a solid line 504 illustrates the behavior of $i_{cc}$, a solid line 506 illustrates the behavior of $i_{vr}$, and a solid line 508 illustrates the behavior of $i_{cb}$. Timing diagram 500 also depicts fluctuations in $v_{cc}$, $i_{cc}$, and $i_{vr}$ such as may be observed in conjunction with the implementation of conventional techniques, such as may be reflected in operating environment 100 of FIG. 1. Namely, dashed lines 512, 514, and 516 illustrate examples of behaviors of $v_{cc}$, $i_{cc}$, and $i_{vr}$, respectively, that may be expected to be observed according to conventional techniques.

At a time $T_0$, electronic element 104 may be idle. Thus, the input voltage $v_{cc}$ at electronic element 104 at time $T_0$ may be equal to $V_{cc\text{-}idle}$, and the input current $i_{cc}$ that electronic element 104 draws at time $T_0$ may be equal to $I_{cc\text{-}idle}$. At a time $T_1$, electronic element 104 may begin transitioning from the idle state to an excessively power-intensive state, according to which it draws an extraordinary input current $I_{cc\text{-}ext}$ by a time $T_3$. Thus, $i_{cc}$ may ramp up from $I_{cc\text{-}idle}$ at time $T_1$ to $I_{cc\text{-}ext}$ at time $T_3$. From time $T_1$ to time $T_2$, the output current $i_{vr}$ of voltage regulator 202 may generally ramp up in concert with $i_{cc}$, possibly with a slight time lag caused by characteristic effects of capacitor bank 208. As noted above, in some embodiments, $i_{vr}$ may represent a total phase current sourced by voltage regulator 202. At time $T_2$, upon $i_{vr}$ reaching $I_{vr\text{-}lim}$, voltage regulator 202 may transition to a current-limiting mode, according to which it may function as a current source and supply a substantially-fixed output current of $I_{vr\text{-}lim}$. Voltage regulator 202 may remain in the current-limiting mode and supply the substantially-fixed output current of $I_{vr\text{-}lim}$ while $i_{cc}$ remains above $I_{vr\text{-}lim}$. As noted above, in various embodiments, the current-limiting mode may comprise a pulse-by-pulse current limiting mode. From time $T_1$ to time $T_2$, the output current $i_{cb}$ of capacitor bank 208 may comprise a comparatively negligible ripple current $I_r$. Starting at time $T_2$, when $i_{cc}$ ramps above $I_{cc\text{-}app}$ and voltage regulator 202 begins limiting $i_{vr}$ to $I_{vr\text{-}lim}$, capacitor bank 208 may supply an amount of current substantially equal to the difference between $i_{cc}$ and $I_{vr\text{-}lim}$. Thus, $i_{cb}$ may begin ramping up at time $T_2$, eventually reaching a value $I_{sup}$ at time $T_3$, where $I_{sup} = i_{cc\text{-}ext} - I_{vr\text{-}lim}$.

As a result of the $i_{cc}$ ramp-up that begins at time $T_1$, the input voltage $v_{cc}$ of electronic element 104 may begin to drop. Due to the aforementioned $i_{cc}$–$v_{cc}$ time lag, $v_{cc}$ may still be greater than $V_{cc\text{-}app}$ at the time $T_2$ at which $i_{cc}$ reaches $I_{cc\text{-}app}$. However, voltage regulator 202 entering the current-limiting mode at time $T_2$ and limiting $i_{vr}$ to $I_{vr\text{-}lim}$ may cause the capacitor(s) in capacitor bank 208 to discharge relatively quickly, and thus $v_{cc}$ may decrease more rapidly following time $T_2$ than it would in the conventional case. In the conventional case, as illustrated by dashed line 512, $v_{cc}$ may not reach $V_{cc\text{-}app}$ until a time $T_8$, and may not reach a threshold voltage $V_{thresh}$ that is sufficient to trip detector 105—and thus cause detector 105 to trigger a reduction in the power consumption of electronic element 104—until a time $T_9$, at which detector 105 will be exposed to sufficient amount of override causing it to trip. In contrast, according to the disclosed techniques, as illustrated by solid line 502, $v_{cc}$ may decrease to $V_{cc\text{-}app}$ by a time $T_4$, and to $V_{thresh}$ by a time $T_5$. In some embodiments, as reflected in FIG. 5, $V_{thresh}$ may be set equal to $V_{cc\text{-}app}$, minus a small margin to account for potential voltage measurement inaccuracy at detector 105. In various other embodiments, $V_{thresh}$ may be set equal to $V_{cc\text{-}app}$. The embodiments are not limited in this context.

When detector 105 is tripped, it may trigger a reduction in the power consumption of electronic element 104, and thus $i_{cc}$ may decrease from $i_{cc\text{-}ext}$ at time $T_5$ to $I_{cc\text{-}app}$ at $T_6$. In some embodiments, there may be a small delay between the time at which $v_{cc}$ falls below $V_{thresh}$ and the time at which detector 105 causes electronic element 104 to throttle down and reduce $i_{cc}$. As may be appreciated based on the contrast between solid line 504 and dashed line 514, according to the disclosed techniques, the amount of time during which electronic element 104 draws an input current $i_{cc}$ that exceeds $I_{cc\text{-}app}$ may be substantially reduced relative to the conventional case. In this example, rather than drawing an input current $i_{cc}$ that exceeds $I_{cc\text{-}app}$ from time $T_2$ until time $T_{10}$, as it may in the conventional case, electronic element 104 may only draw an input current $i_{cc}$ that exceeds $I_{cc\text{-}app}$ from time $T_2$ until time $T_6$. After that the capacitor bank will be recharged by a current difference ($I_{vr\text{-}lim} - I_{cc\text{-}app}$) until time $T_7$. Furthermore, with the exception of any small marginal amount of current corresponding to the difference between $I_{vr\text{-}lim}$ and $I_{cc\text{-}app}$, the current drawn in excess of $I_{cc\text{-}app}$ may be sourced by capacitor bank 208. Thus, voltage regulator 202 may be selected subject to a constraint that it needs to be able to source only $I_{vr\text{-}lim}$ rather than being required to support higher $i_{vr}$ values such as $I_{cc\text{-}ext}$. As such, it may be possible to use a smaller and/or less costly voltage regulator to implement voltage regulator 202 than that which would be required in the conventional case.

Figure 6:
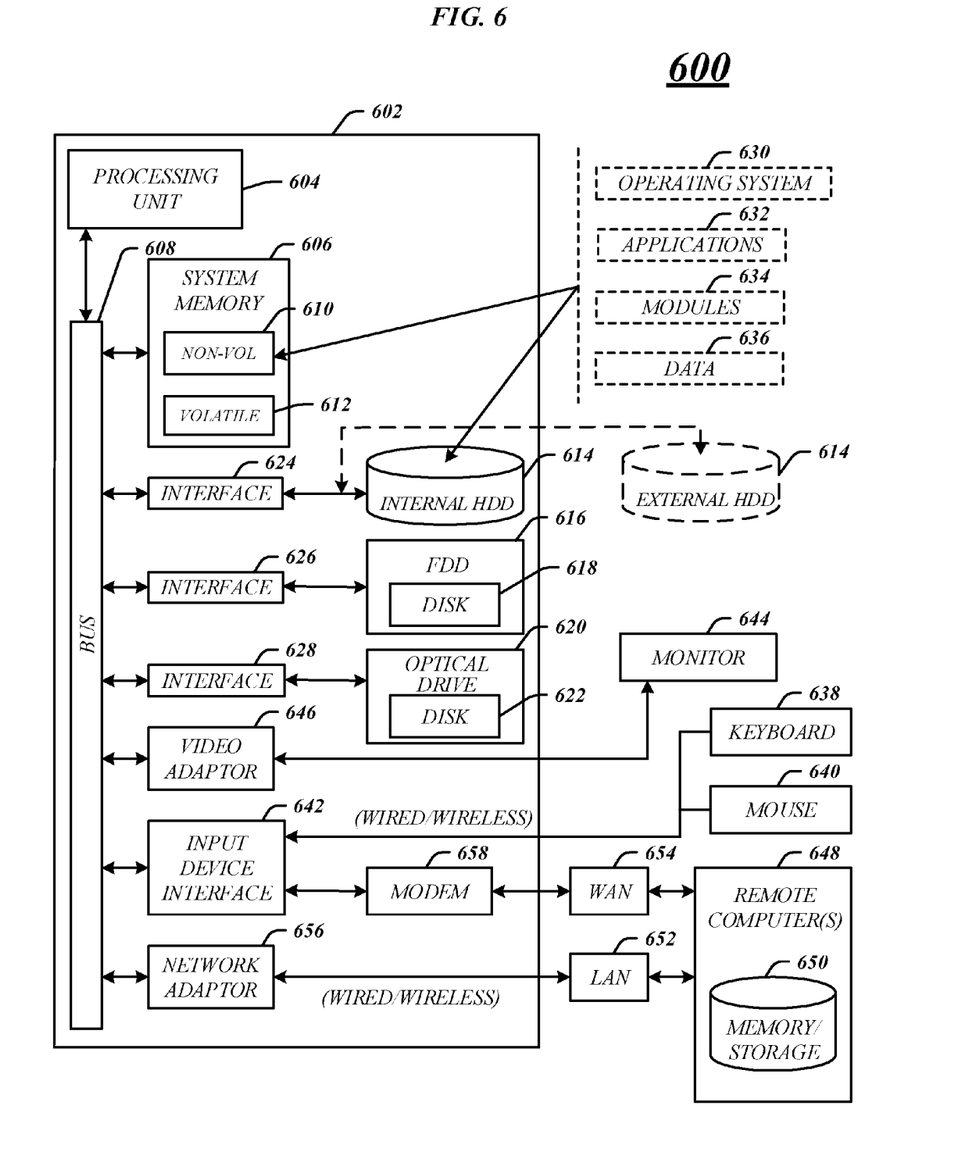
FIG. 6 illustrates an embodiment of a computing architecture.

FIG. 6 illustrates an embodiment of an exemplary computing architecture 600 that may be suitable for implementing various embodiments as previously described. In various embodiments, the computing architecture 600 may comprise or be implemented as part of an electronic device. In some embodiments, the computing architecture 600 may be representative, for example, of a computing device that comprises apparatus 200 of FIGS. 2-4. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, according to computing architecture 600, a computer 602 comprises a processing unit 604, a system memory 606 and a system bus 608. In some embodiments, computer 602 may comprise a server. In some embodiments, computer 602 may comprise a client. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
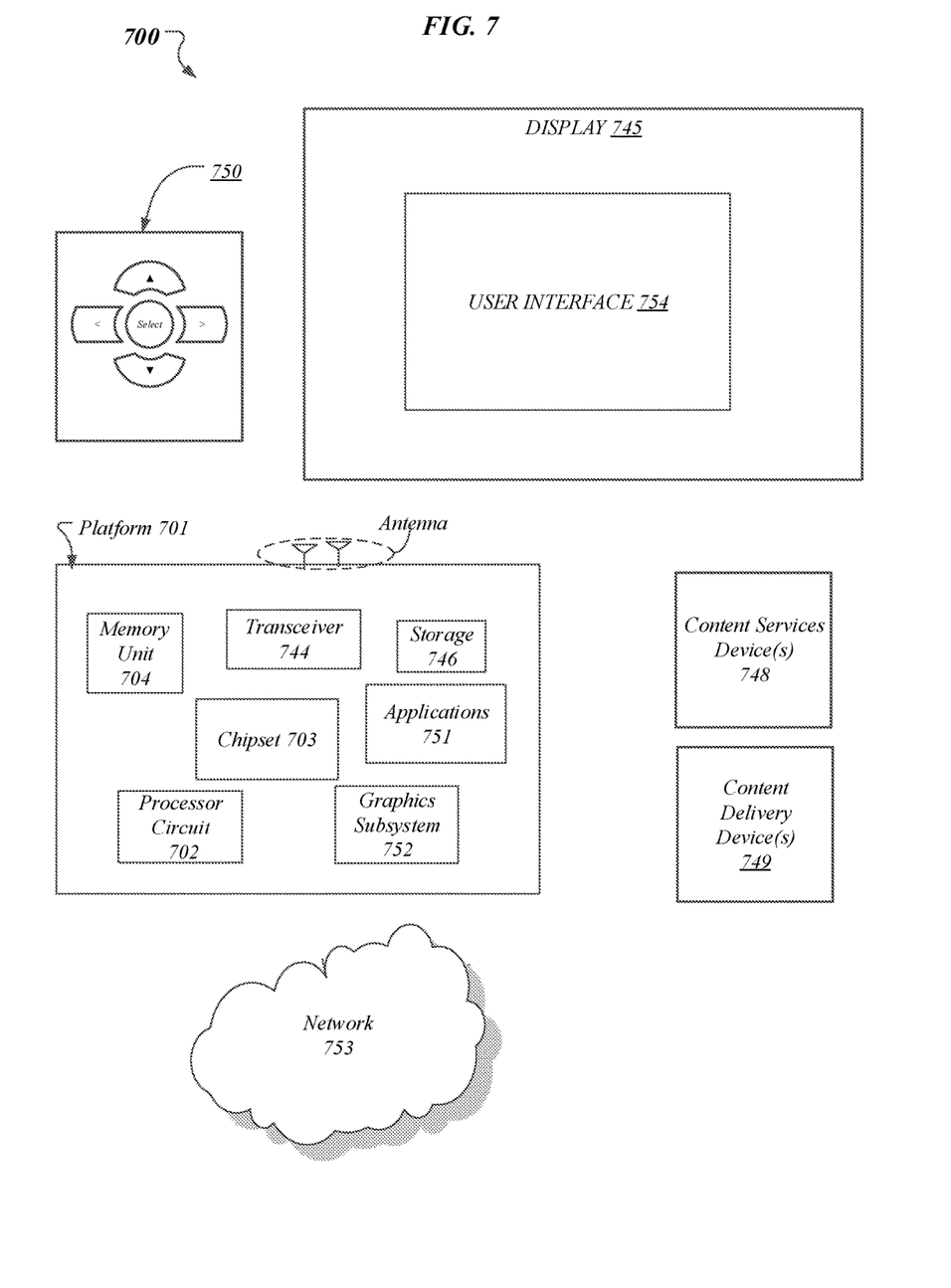
FIG. 7 illustrates an embodiment of a system.

FIG. 7 illustrates an embodiment of a system 700. In various embodiments, system 700 may be representative of a system or architecture that is realized according to one or more techniques described herein, such as a system or architecture that is implemented using one or both of apparatus 200 of FIGS. 2-4 and computing architecture 600 of FIG. 6. The embodiments are not limited in this respect.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 includes a platform 701 coupled to a display 745. Platform 701 may receive content from a content device such as content services device(s) 748 or content delivery device(s) 749 or other similar content sources. A navigation controller 750 including one or more navigation features may be used to interact with, for example, platform 701 and/or display 745. Each of these components is described in more detail below.

In embodiments, platform 701 may include any combination of a processor circuit 702, chipset 703, memory unit 704, transceiver 744, storage 746, applications 751, and/or graphics subsystem 752. Chipset 703 may provide intercommunication among processor circuit 702, memory unit 704, transceiver 744, storage 746, applications 1851, and/or graphics subsystem 752. For example, chipset 703 may include a storage adapter (not depicted) capable of providing intercommunication with storage 746.

Processor circuit 702 may be implemented using any processor or logic device, and may be the same as or similar to processing unit 604 of FIG. 6. Memory unit 704 may be implemented using any machine-readable or computer-readable media capable of storing data, and may be the same as or similar to system memory 606 of FIG. 6. Transceiver 744 may include one or more radios capable of transmitting and receiving signals using various suitable wireless communications techniques. Display 745 may include any television type monitor or display, and may be the same as or similar to monitor 644 of FIG. 6. Storage 746 may be implemented as a non-volatile storage device, and may be the same as or similar to HDD 614 of FIG. 6.

Graphics subsystem 752 may perform processing of images such as still or video for display. Graphics subsystem 752 may be a graphics processing unit (GPU) or a visual processing unit (VPU), for example. An analog or digital interface may be used to communicatively couple graphics subsystem 752 and display 745. For example, the interface may be any of a High-Definition Multimedia Interface, DisplayPort, wireless HDMI, and/or wireless HD compliant techniques. Graphics subsystem 752 could be integrated into processor circuit 702 or chipset 703. Graphics subsystem 752 could be a stand-alone card communicatively coupled to chipset 703.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 748 may be hosted by any national, international and/or independent service and thus accessible to platform 701 via the Internet, for example. Content services device(s) 748 may be coupled to platform 701 and/or to display 745. Platform 701 and/or content services device(s) 748 may be coupled to a network 753 to communicate (e.g., send and/or receive) media information to and from network 753. Content delivery device(s) 749 also may be coupled to platform 701 and/or to display 745.

In embodiments, content services device(s) 748 may include a cable television box, personal computer, network, telephone, Internet enabled devices or appliance capable of delivering digital information and/or content, and any other similar device capable of unidirectionally or bidirectionally communicating content between content providers and platform 701 and/display 745, via network 753 or directly. It will be appreciated that the content may be communicated unidirectionally and/or bidirectionally to and from any one of the components in system 700 and a content provider via network 753. Examples of content may include any media information including, for example, video, music, medical and gaming information, and so forth.

Content services device(s) 748 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 701 may receive control signals from navigation controller 750 having one or more navigation features. The navigation features of navigation controller 750 may be used to interact with a user interface 754, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 750 may be echoed on a display (e.g., display 745) by movements of a pointer, cursor, focus ring, or other visual indicators displayed on the display. For example, under the control of software applications 751, the navigation features located on navigation controller 750 may be mapped to virtual navigation features displayed on user interface 754. In embodiments, navigation controller 750 may not be a separate component but integrated into platform 701 and/or display 745. Embodiments, however, are not limited to the elements or in the context shown or described herein.

In embodiments, drivers (not shown) may include technology to enable users to instantly turn on and off platform 701 like a television with the touch of a button after initial boot-up, when enabled, for example. Program logic may allow platform 701 to stream content to media adaptors or other content services device(s) 748 or content delivery device(s) 749 when the platform is turned "off." In addition, chip set 703 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 700 may be integrated. For example, platform 701 and content services device(s) 748 may be integrated, or platform 701 and content delivery device(s) 749 may be integrated, or platform 701, content services device(s) 748, and content delivery device(s) 749 may be integrated, for example. In various embodiments, platform 701 and display 745 may be an integrated unit. Display 745 and content service device(s) 748 may be integrated, or display 745 and content delivery device(s) 749 may be integrated, for example. These examples are not meant to limit the disclosed subject matter.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 701 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
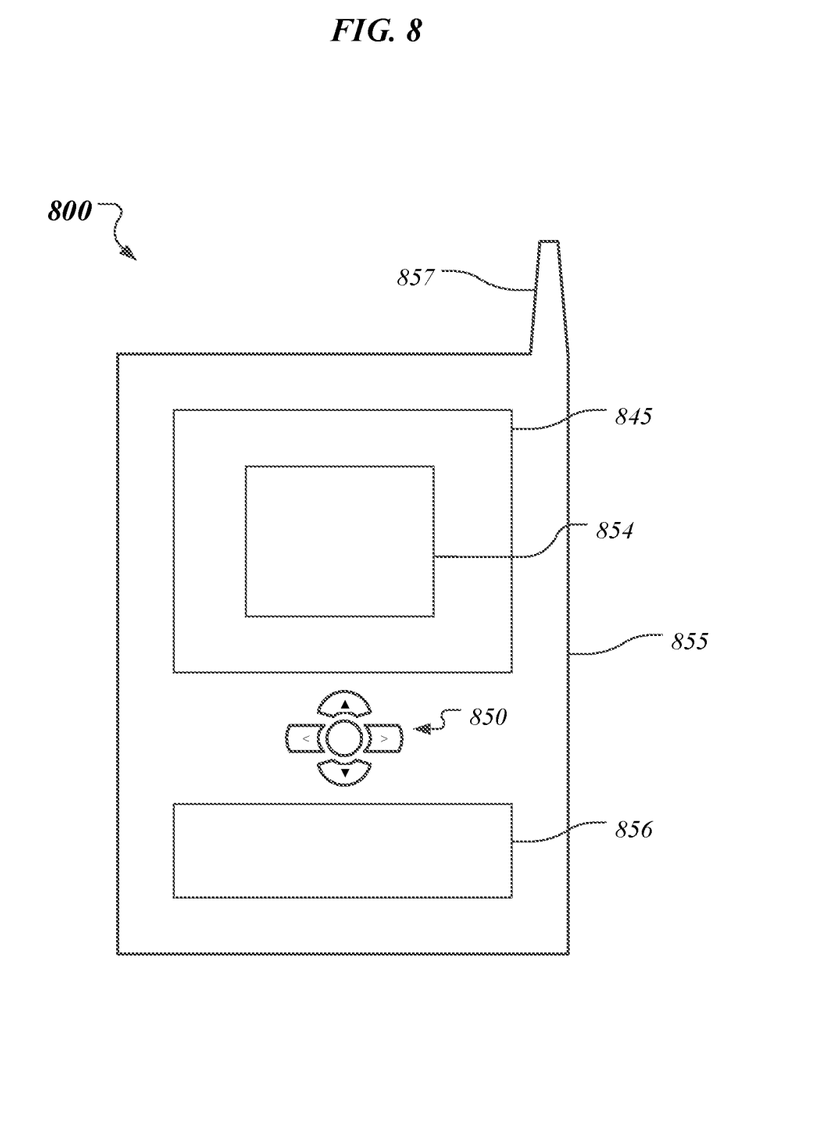
FIG. 8 illustrates an embodiment of a device.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a display 845, a navigation controller 850, a user interface 854, a housing 855, an I/O device 856, and an antenna 857. Display 845 may include any suitable display unit for displaying information appropriate for a mobile computing device, and may be the same as or similar to display 745 in FIG. 7. Navigation controller 850 may include one or more navigation features which may be used to interact with user interface 854, and may be the same as or similar to navigation controller 750 in FIG. 7. I/O device 856 may include any suitable I/O device for entering information into a mobile computing device. Examples for I/O device 856 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising an electronic element comprising one or more integrated circuits, a voltage regulator to regulate an input voltage of the electronic element, the voltage regulator to source an output current comprising at least a portion of an input current of the electronic element, the voltage regulator to operate in a current-limiting mode to limit the output current when the input current exceeds a threshold current, and a capacitor bank comprising one or more capacitors, the capacitor bank to source a supplemental current to supplement the output current of the voltage regulator when the voltage regulator operates in the current-limiting mode.

Example 2 is the apparatus of Example 1, the electronic element comprising a detector to monitor the input voltage of the electronic element.

Example 3 is the apparatus of Example 2, the detector to generate a signal to trigger a reduction in an operating power of the electronic element in response to a detection that the input voltage is less than a threshold voltage.

Example 4 is the apparatus of Example 3, the electronic element to transition from a first power state to a second power state in response to the signal.

Example 5 is the apparatus of Example 4, the second power state associated with a reduced operating frequency relative to the first power state.

Example 6 is the apparatus of any of Examples 1 to 5, the voltage regulator to prevent the output current from exceeding an allowable current limit while operating in the current-limiting mode.

Example 7 is the apparatus of Example 6, the allowable current limit of the voltage regulator to comprise a programmable value.

Example 8 is the apparatus of any of Examples 1 to 7, the voltage regulator to comprise a multi-phase voltage regulator.

Example 9 is the apparatus of any of Examples 1 to 8, the current-limiting mode to comprise a pulse-by-pulse current limiting mode.

Example 10 is the apparatus of any of Examples 1 to 9, the one or more capacitors to comprise filter capacitors.

11 is the apparatus of any of Examples 1 to 10, the electronic element comprising a processor circuit.

Example 12 is the apparatus of any of Examples 1 to 10, the electronic element comprising a memory module.

Example 13 is a system, comprising an apparatus according to any of Examples 1 to 12, and a network interface controller.

Example 14 is an apparatus, comprising means for regulating an input voltage of an electronic element comprising one or more integrated circuits, means for sourcing an output current comprising at least a portion of an input current of the electronic element, means for limiting the output current to prevent the output current from exceeding an allowable current limit, and means for sourcing a supplemental current to supplement the output current when the input current of the electronic element exceeds the allowable current limit.

Example 15 is the apparatus of Example 14, comprising means for monitoring the input voltage of the electronic element.

Example 16 is the apparatus of Example 15, comprising means for generating a signal to trigger a reduction in an operating power of the electronic element in response to a detection that the input voltage is less than a threshold voltage.

Example 17 is the apparatus of Example 16, the signal to prompt the electronic element to transition from a first power state to a second power state.

Example 18 is the apparatus of Example 17, the second power state associated with a reduced operating frequency relative to the first power state.

Example 19 is the apparatus of any of Examples 14 to 18, the allowable current limit to comprise a programmable value.

Example 20 is the apparatus of any of Examples 14 to 19, comprising means for regulating the input voltage of the electronic element via multiple voltage regulation phases.

Example 21 is the apparatus of any of Examples 14 to 20, comprising means for limiting the output current using pulse-by-pulse current limitation.

22 is the apparatus of any of Examples 14 to 21, the electronic element to comprise a processor circuit.

Example 23 is the apparatus of any of Examples 14 to 21, the electronic element to comprise a memory module.

Example 24 is a system, comprising an apparatus according to any of Examples 14 to 23, and a network interface controller.

Example 25 is an apparatus, comprising a processor circuit comprising a detector to monitor an input voltage at a power terminal of the processor circuit, the detector to generate a signal to trigger a reduction in an operating power of the processor circuit in response to a detection that the input voltage is less than a threshold voltage, a voltage regulator to regulate the input voltage, the voltage regulator to source an output current comprising at least a portion of an input current of the processor circuit, the voltage regulator to prevent the output current from exceeding an allowable current limit, and a capacitor bank comprising one or more capacitors, the capacitor bank to source a supplemental current to supplement the output current of the voltage regulator when the input current of the processor circuit exceeds the allowable current limit.

Example 26 is the apparatus of Example 25, the processor circuit to transition from a first power state to a second power state in response to the signal.

Example 27 is the apparatus of Example 26, the second power state associated with a reduced operating frequency relative to the first power state.

Example 28 is the apparatus of any of Examples 25 to 27, the voltage regulator to prevent the output current from exceeding the allowable current limit while operating in a current-limiting mode.

Example 29 is the apparatus of Example 28, the current-limiting mode to comprise a pulse-by-pulse current limiting mode.

Example 30 is the apparatus of any of Examples 25 to 29, the allowable current limit of the voltage regulator to comprise a programmable value.

Example 31 is the apparatus of any of Examples 25 to 30, the voltage regulator to comprise a multi-phase voltage regulator.

Example 32 is the apparatus of any of Examples 25 to 31, the one or more capacitors to comprise filter capacitors.

Example 33 is a system, comprising an apparatus according to any of Examples 25 to 32, and a memory unit.

Example 34 is the system of Example 33, comprising at least one radio frequency (RF) transceiver, and at least one RF antenna.

Example 35 is the system of any of Examples 33 to 34, comprising a touchscreen display.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   an electronic element comprising one or more integrated circuits;
   a voltage regulator to regulate an input voltage of the electronic element, the voltage regulator to source an output current comprising at least a portion of an input current of the electronic element, the voltage regulator to operate in a current-limiting mode to limit the output current when the input current exceeds a threshold current; and
   a capacitor bank comprising one or more capacitors, the capacitor bank to source a supplemental current to supplement the output current of the voltage regulator when the voltage regulator operates in the current-limiting mode, wherein sourcing the supplemental current from the capacitor bank accelerates a drop in the input voltage of the electronic element.

2. The apparatus of claim 1, the electronic element comprising a detector to monitor the input voltage of the electronic element.

3. The apparatus of claim 2, the detector to generate a signal to trigger a reduction in an operating power of the electronic element in response to a detection that the input voltage is less than a threshold voltage.

4. The apparatus of claim 3, the electronic element to transition from a first power state to a second power state in response to the signal.

5. The apparatus of claim 4, the second power state associated with a reduced operating frequency relative to the first power state.

6. The apparatus of claim 1, the voltage regulator to prevent the output current from exceeding an allowable current limit while operating in the current-limiting mode.

7. The apparatus of claim 6, the allowable current limit of the voltage regulator to comprise a programmable value.

8. The apparatus of claim 1, the voltage regulator to comprise a multi-phase voltage regulator.

9. The apparatus of claim 1, the current-limiting mode to comprise a pulse-by-pulse current limiting mode.

10. The apparatus of claim 1, the one or more capacitors to comprise filter capacitors.

11. The apparatus of claim 1, the electronic element comprising a processor circuit.

12. The apparatus of claim 1, the electronic element comprising a memory module.

13. An apparatus, comprising:
    a processor circuit comprising a detector to monitor an input voltage at a power terminal of the processor circuit, the detector to generate a signal to cause the processor circuit to transition to a reduced operating frequency in response to a detection that the input voltage is less than a threshold voltage;
    a voltage regulator to regulate the input voltage, the voltage regulator to source an output current comprising at least a portion of an input current of the processor circuit, the voltage regulator to prevent the output current from exceeding an allowable current limit; and
    a capacitor bank comprising one or more capacitors, the capacitor bank to source a supplemental current to supplement the output current of the voltage regulator when the input current of the processor circuit exceeds the allowable current limit, wherein sourcing the supplemental current from the capacitor bank accelerates a drop in the input voltage at the power terminal of the processor circuit.

14. A method, comprising:
    regulating an input voltage of an electronic element with a voltage regulator, the electronic element comprising one or more integrated circuits;
    sourcing an output current comprising at least a portion of an input current of the electronic element with the voltage regulator;
    operating the voltage regulator in a current-limiting mode when the input current of the electronic element exceeds a threshold current to limit the output current of the voltage regulator; and
    sourcing a supplemental current with a capacitor bank comprising one or more capacitors to supplement the output current of the voltage regulator when the voltage regulator operates in the current-limiting mode, wherein sourcing the supplemental current from the capacitor bank accelerates a drop in the input voltage of the electronic element.

15. The method of claim 14, comprising monitoring the input voltage of the electronic element with a detector, the electronic element comprising the detector.

16. The method of claim 15, generating, with the detector, a signal to trigger a reduction in an operating power of the electronic element in response to a detection that the input voltage is less than a threshold voltage.

17. The method of claim 16, transitioning the electronic element from a first power state to a second power state in response to the signal.

18. The method of claim 17, the second power state associated with a reduced operating frequency relative to the first power state.

19. The method of claim 14, preventing, with the voltage regulator, the output current from exceeding an allowable current limit while operating in the current-limiting mode.

20. The method of claim 19, the allowable current limit of the voltage regulator comprising a programmable value.

21. The method of claim 14, the voltage regulator comprising a multi-phase voltage regulator.

22. The method of claim 14, the current-limiting mode comprising a pulse-by-pulse current limiting mode.

23. The method of claim 14, the one or more capacitors comprising filter capacitors.

24. The method of claim 14, the electronic element comprising a processor circuit.

25. The method of claim 14, the electronic element comprising a memory module.

* * * * *